United States Patent

[11] 3,622,675

[72] Inventors Herbert Koppe;
 Gerhard Ludwig; Karl Zeille, all of Ingelheim/Rhine, Germany
[21] Appl. No. 819,939
[22] Filed Apr. 28, 1969
[45] Patented Nov. 23, 1971
[73] Assignee Boehringer Ingelheim GmbH
 Ingelheim am Rhine, Germany
[32] Priority Apr. 8, 1964
[33] Germany
[31] B 76239
 Original application Mar. 24, 1965, Ser. No. 442,539, now abandoned. Divided and this application Apr. 28, 1969, Ser. No. 819,939

[54] ANOREXIGENIC COMPOSITION AND METHOD
 2 Claims, No Drawings
[52] U.S. Cl. .................................................. 424/304, 424/330
[51] Int. Cl. ........................................................ A61k 27/00

[50] Field of Search .......................................... 424/304, 330, 331

[56] References Cited
 UNITED STATES PATENTS

| | | | |
|---|---|---|---|
| 1,767,423 | 6/1930 | Adams ......................... | 260/570.6 |
| 2,155,194 | 4/1939 | Kamlet ......................... | 260/570.5 |
| 3,171,858 | 3/1965 | L'Italien ....................... | 260/570.5 |
| 3,313,687 | 4/1967 | Siemer ......................... | 260/570.5 X |

OTHER REFERENCES

Corrodi et al., " Jour. Med. Chem., Vol. 6, No. 6, pages 751- 755 (1963)

Primary Examiner—Albert T. Meyers
Assistant Examiner—Frederick E. Waddell
Attorney—Hammond & Littell ABSTRACT: Anorexigenic compositions comprising a 1-phenyl-2-(lower alkyl-amino)-lower alkanone-(1) or a nontoxic acid addition salt thereof aS an active ingredient, and a method of curbing the appetite of warmblooded animals therewith.

ANOREXIGENIC COMPOSITION AND METHOD

This is a division of copending application Ser. No. 442,539, filed Mar. 24, 1965 now abandoned.

This invention relates to anorectic compositions, as well as to a method of curbing the appetite of warmblooded animals therewith.

More particularly, the present invention relates to anorectic compositions comprising as an active ingredient a racemic mixture of a 1-phenyl-2-(lower alkyl-amino)-lower alkanone-(1) of the formula

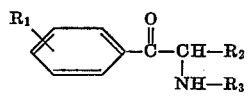

(I)

wherein $R_1$ is hydrogen, straight or branched lower alkyl, or cyano, preferably methyl, and $R_2$ and from 3, which may be identical to or different form each other, are straight or branched alkyl of two to four carbon atoms, an optical antipode component thereof, or a nontoxic, pharmacologically acceptable acid addition salt of said racemic mixture or of said optical antipode.

A compound of the formula I above may be prepared by a variety of methods involving known chemical principles; however, among these the following have been found to be most convenient and efficient:

Method A

1. By reacting a 1-phenyl-2-halo-lower alkanone of the formula

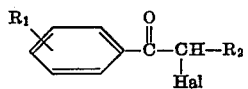

(II)

wherein $R_1$ and $R_2$ have the same meanings as in formula I and Hal is halogen, with a primary amine of the formula $$H_2N-R_3 \quad (III)$$

wherein $R_3$ has the same meanings as in formula I. The reaction is advantageously carried out in the presence of an inert organic solvent, such as benzene or ethanol, and at a temperature below 100° C. For the purpose of tying up or neutralizing the hydrogen halide liberated by the reaction, an inorganic or organic base may be added to the reaction mixture; however, it is preferred to use an excess of the amine of the formula III for this purpose.

The reaction mixture is worked up pursuant to known methods; for instance, by dissolving the reaction product in ether and reprecipitating it in the form of a hydrohalide addition salt.

2. An alternative variation of the method described in (1) above is the reaction of an α-bromoalkanone of the formula II with the potassium salt of a phenylsulfonic acid alkylamide, preferably with the potassium salt of a toluenesulfonic acid alkylamide of the formula

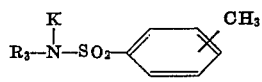

(IV)

wherein $R_3$ has the same meanings as in formula I, accompanied by release of potassium bromide. The intermediate product is then transformed into a compound of the formula I with the aid of an acid, especially by several hours' boiling with concentrated hydrochloric acid accompanied by release of toluenesulfonic acid.

3. A further alternative variation of the process described in (1) above comprises reacting a haloalkanone of the formula II with an alkali metal alcoholate to form as an intermediate product an epoxyether of the formula

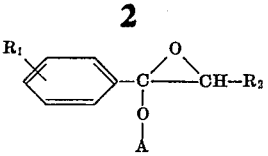

(V)

wherein $R_1$ and $R_2$ have the same meanings as in formula I and A is lower alkyl, and subsequently reacting the intermediate product with a primary amine of the formula III. The reaction mixture is then worked up as described in (1).

Method B

By monoalkylating a 1-phenyl-2-amino-alkanone-(1) of the formula

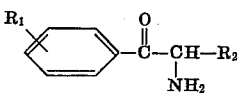

(VI)

wherein $R_1$ and $R_2$ have the same meanings as in formula I, with an alkylating agent of the formula $$R_3-X \quad (VII)$$

wherein $R_3$ has the same meanings as in formula I and X is halogen, sulfate, sulfonyl or the like. The alkylating reaction is preferably carried out in the presence of a compound capable of tying up or neutralizing the acid released by the reaction, such as an alkali metal or an alkali metal alcoholate, and advantageously in aqueous suspension or in the presence of an inert organic solvent. In order to prevent the formation of a tertiary amine, i.e. to prevent dialkylation of the primary amino group of compound VI, it is preferred to perform the reaction with no more than the stoichiometrically required ratio of the reactants and especially by providing less than the stoichiometrically required amount of amine or adding the alkylating agent slowly.

Method C

By converting the tertiary amino group of a 1-phenyl-2-amino-alkanone-(1) of the formula

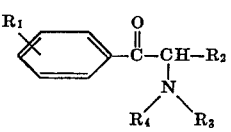

(VIII)

wherein wherein $R_1$, $R_2$ and $R_{33}$ have the same meanings as in formula I and $R_4$ is a substituent which is readily split off, into a secondary amino group ($-NH-R_3$). Examples of substituents which may readily split off include acyl and aralkyl substituents, especially carbobenzoxy and benzyl. In the event that $R_4$ is aralkyl, such as benzyl, the conversion of $R_4$ into hydrogen may, for example, be effected by selective hydrogenation with palladium chloride/animal charcoal in the presence of ethanol. If $R_4$ is acyl, such as carbobenzoxy, its removal may be effected in conventional fashion, such as by hydrogenation or hydrolysis.

Method D

By converting the phenyl substituent ($R_5$) of a 1-phenyl-2-amino-alkanone-(1) of the formula

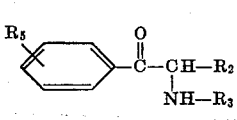

(IX)

wherein $R_2$ and $R_3$ have the same meanings as in formula I and $R_5$ is other than hydrogen, alkyl or cyano, into a substituent $R_1$ as defined in formula I. For instance, if $R_5$ is halogen it may be exchanged for cyano by treating the halophenyl compound with copper cyanide in a polar organic solvent, such as pyridine or dimethylformamide.

A cyanophenyl compound of the formula I ($R_1$ =CN) may also be obtained by dehydrating a suitable precursor of the formula IX, such as one wherein $R_5$ is —$CONH_2$, by conventional procedures.

A cyanophenyl compound of the formula I may also be obtained by subjecting a 1-aminophenyl-2-amino-alkanone of the formula

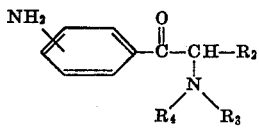

wherein $R_2$ and $R_3$ have the same meanings as in formula I and $R_4$ has the same meanings as in formula VIII, to the Sandmeyer Reaction, Berichte 17, 1633, 2650 (1884), and subsequent removal of the substituent $R_4$ by method C above.

Method E

By oxidizing an aminoalcohol of the formula

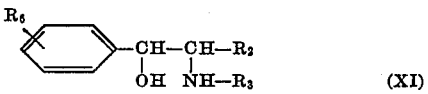 (XI)

wherein $R_6$ is hydrogen or lower alkyl (i.e. the same as $R_1$ in formula I except cyano) and $R_2$ and $R_3$ have the same meanings as in formula I, with an oxidizing agent such as chromic acid or an alkali metal dichromate. The oxidation reaction, which proceeds readily at room temperature or slightly elevated temperatures, may be performed in the presence of an aqueous solvent at an acid pH.

Method F

By reacting a compound of the formula

 (XII)

wherein Z is an unsubstituted or substituted carboxamide group or cyano and $R_2$ and $R_3$ have the same meanings as in formula I, with a phenyl magnesium halide of the formula

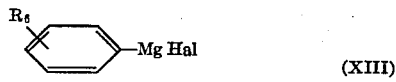 (XIII)

wherein $R_6$ has the same meanings as in formula XI and Hal is halogen, under anhydrous conditions, and subsequently hydrolyzing the reaction product.

The reaction between compounds XII and XIII in an anhydrous medium is carried out under customary conditions, namely, in anhydrous ether or tetrahydrofuran at moderately elevated temperatures.

If Z in formula XII is cyano, the reaction proceeds best in a mixture of benzene and tetrahydrofuran under reflux, i.e. at about 60° C.

Since the Grignard reagent may react with the hydrogen of the amino group (—$NHR_3$), it is recommended to provide an additional mol of the Grignard reagent.

Method G

By reacting an α-amino-cyanoalkane of the formula

 (XIV)

wherein $R_1$ and $R_2$ have the same meanings as in formula I, with a benzene compound of the formula

 (XV)

wherein $R_1$ has the same meanings as in formula I, in the presence of a Friedel-Crafts catalyst, such as a mixture of aluminum chloride and hydrochloric acid, and subsequently hydrolyzing the ketimine reaction product.

The reaction between compounds XIV and XV may be carried out in the presence of a solvent customarily used for this type of reaction, such as nitrobenzene; when aluminum chloride is used as the catalyst, it proceeds smoothly at slightly elevated temperatures while introducing hydrogen chloride into the reaction mixture for several hours.

The compounds of the formula I have optically active centers and therefore occur as racemic mixtures which may be divided into the respective optical antipodes in customary fashion, such as by fractional crystallization of their camphor-sulfonates.

The compounds embraced by formula I are bases and may, if desired, be converted into their nontoxic, pharmacologically acceptable acid addition salts by conventional methods, such as by dissolving the free base in a suitable solvent, and acidifying the solution with the desired inorganic or organic acid. Examples of inorganic and organic acids which will form nontoxic, pharmacologically acceptable acid addition salts with the basic compounds of the formula I above are hydrochloric acid, sulfuric acid, acetic acid, tartaric acid, maleic acid, sulfaminic acid, 8-chlorotheophylline and the like.

The following examples further illustrate the present invention and will enable others skilled in the art to understand it more completely. It should be understood, however, that the invention is not limited to the particular examples given below.

EXAMPLE 1

Preparation of 1-phenyl-2-n-propylamino-butanone-(1) and its hydrochloride by Method A(1)

Eighty-seven grams (0.387 mol) of 1-phenyl-2-bromo-butanone-(1) were dissolved in 200 cc. of benzene, and the resulting solution was cooled to 5° C. on an ice water bath. At that temperature, and while stirring the solution, 71 g. (1.2 mols) of n-propylamine were added and the ice water bath was removed. An exothermic reaction commenced, and the temperature of the reaction mixture was maintained at 45° C. by exterior cooling with water. Thereafter, the reaction mixture was allowed to stand at room temperature for 3½ hours. At the end of that time the precipitated n-propylamine hydrobromide was separated by vacuum filtration, the filtrate was washed three times with water, and the organic phase was dried over magnesium sulfate. Thereafter, the benzene was completely distilled off in vacuo, leaving as a residue 78 g. (98.5 percent of theory) of a substance which was identified to be 1-phenyl-2-n-propyl-amino-butanone-(1) of the formula

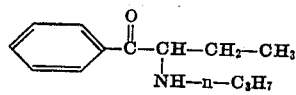

A portion of the product thus obtained was dissolved in ether, and the solution was acidified with ethereal hydrochloric acid. The precipitate formed thereby was collected and recrystallized from a mixture of ethanol and ether. The purified product had a melting point of 205°–207° C. and was found to be the hydrochloride of 1-phenyl-2-n-propylamino-butanone-(1).

Another portion of the free base was dissolved in acetone, and the solution was admixed with an ethereal solution of a molar excess of maleic acid. The precipitate formed thereby was collected and recrystallized from a mixture of acetonitrile and ether. The purified product had a melting point of 122°–124° C. and was found to be the acid maleate of 1-phenyl-2-n-propylamino-butanone-(1).

EXAMPLE 2

Using a procedure analogous to that described in example 1, 1-phenyl-2-isopropylamino-butanone-(1) of the formula

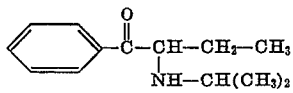

was prepared from 1-phenyl-2-bromo-butanone-(1) and isopropylamine. Its hydrochloride had a melting point of 256°–258° C.

EXAMPLE 3

Using a procedure analogous to that described in example 1, 1 1-o-tolyl-2-ethylamino-butanone-(1) of the formula

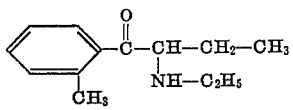

was prepared from 1-o-tolyl-2-bromo-butanone-(1) and ethylamine. Its hydrochloride had a melting point of 192°–196 °C.

EXAMPLE 4

Using a procedure analogous to that described in example 1, 1-o-tolyl-2-n-propylamino-butanone-(1) was prepared from 1-o-tolyl-2-bromo-butanone-(1) and n-propylamine. Its hydrochloride had a melting point of 196°–200° C.

EXAMPLE 5

Using a procedure analogous to that described in example 1, 1-o-tolyl-2-isopropylamino-butanone-(1) was prepared from 1-o-tolyl-2-bromo-butanone-(1) and isopropylamine. Its hydrochloride had a melting point of 215°–218° C.

EXAMPLE 6

Using a procedure analogous to that described in example 1, 1-m-tolyl-2-ethylamino-butanone-(1) of the formula

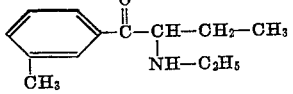

was prepared from 1-m-tolyl-2-bromo-butanone-(1) and ethylamine. Its hydrochloride had a melting point of 215°–217 °C.

EXAMPLE 7

Using a procedure analogous to that described in example 1, 1-m-tolyl-2-isopropylamino-butanone-(1)was prepared from 1-m-tolyl-2-bromo-butanone-(1) was prepared from 1-m-tolyl-2-bromo-butanone-(1) and isopropylamine. Its hydrochloride had a melting point of 245°–248° C.

EXAMPLE 8

Using a procedure analogous to that described in example 1, 1-m-tolyl-2-n-propylamino-butanone-(1) was prepared from 1-m-tolyl-2-bromo-butanone-(1) and n-propylamine. Its hydrochloride had a melting point of 202°–205° C.

EXAMPLE 9

Using a procedure analogous to that described in example 1, 1-p-tolyl-2-ethylamino-butanone-(1) of the formula

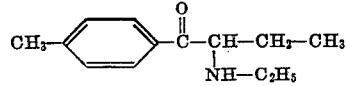

was prepared from 1-p-tolyl-2-bromo-butanone-(1) and ethylamine. Its hydrochloride had a melting point of 223°–224 °C.

EXAMPLE 10

Using a procedure analogous to that described in example 1, 1-p-tolyl-2-n-propylamino-butanone-(1) was prepared from 1-p-toly-2-bromo-butanone-(1) and n-propylamine. Its hydrochloride had a melting point of 209°–211° C.

EXAMPLE 11

Using a procedure analogous to that described in example 1, 1-p-tolyl-2-isopropylamino-butanone-(1) was prepared from 1-p-tolyl-2-bromo-butanone-(1) and isopropylamine. Its hydrochloride had a melting point of 227°–229° C.

EXAMPLE 12

Using a procedure analogous to that described in example 1, 1-phenyl-2-ethylamino-pentanone-(1) of the formula

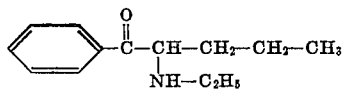

was prepared from 1-phenyl-2-bromo-pentanone-(1) and ethylamine. Its hydrochloride had a melting point of 202.5°–2 06° C.

EXAMPLE 13

Using a procedure analogous to that described in example 1, 1-phenyl-2-n-propylamino-pentanone-(1) was prepared from 1-phenyl-2-bromo-pentanone-(1) and n-propylamine. Its hydrochloride had a melting point of 214°–217.5° C.

EXAMPLE 14

Using a procedure analogous to that described in example 1, 1-phenyl-2-isopropylamino-pentanone-(1) was prepared from 1-phenyl-2-bromo-pentanone-(1) and isopropylamine. Its hydrochloride had a melting point of 227°–228° C.

EXAMPLE 15

Using a procedure analogous to that described in example 1 1-phenyl-2n-butylamino-pentanone-(1) was prepared from 1-phenyl-2-bromo-pentanone-(1) and n-butylamine. Its hydrochloride had a melting point of 198°–200° C.

EXAMPLE 6

Using a procedure analogous to that described in example 1, 1-phenyl-2-sec. butylamino-pentanone-(1) was prepared from 1-phenyl-2-bromo-pentanone-(1) and sec.butylamine. Its hydrochloride had a melting point of 195.5°–198° C.

EXAMPLE 17

Using a procedure analogous to that described in example 1, 1-o-tolyl-2-ethylamino-pentanone-(1) was prepared from 1-o-tolyl-2-bromo-pentanone-(1) and ethylamine. Its hydrochloride had a melting point of 176°–181° C.

EXAMPLE 18

Using a procedure analogous to that described in example 1, 1-o-tolyl-2-n-propylamino-pentanone-(1) was prepared from 1-o-tolyl-2-bromo-pentanone-(1) and n-propylamine. Its hydrochloride had a melting point of 190°–193° C.

EXAMPLE 19

Using a procedure analogous to that described in example 1, 1-o-tolyl-2-isopropylamino-pentanone-(1) was prepared from 1-o-tolyl-2-bromo-pentanone-(1) and isopropylamine. Its hydrochloride had a melting point of 208°–216° C.

EXAMPLE 20

Using a procedure analogous to that described in example 1, 1-o-tolyl-2-n-butylamino-pentanone-(1) was prepared from 1-O-tolyl-2-bromo-pentanone-(1) and n-butylamine. Its hydrochloride had a melting point of 189°–191.5° C.

EXAMPLE 21

Using a procedure analogous to that described in example 1, 1-o-tolyl-2-sec.butylamino-pentanone-(1) was prepared from 1-O-tolyl-2-bromo-pentanone-(1) and sec.butylamine. Its hydrochloride had a melting point of 183.5°–187.5° C.

EXAMPLE 22

Using a procedure analogous to that described in example 1, 1-m-tolyl-2-ethylamino-pentanone-(1) was prepared from 1-m-tolyl-2-bromo-pentanone-(1) and ethylamine. Its hydrochloride had a melting point of 191°–194.5° C.

EXAMPLE 23

Using a procedure analogous to that described in example 1, 1-M-tolyl-2-n-propylamino-pentanone-(1) was prepared from 1-m-tolyl-2-bromo-pentanone-(1) and n-propylamine. Its hydrochloride had a melting point of 199°–200° C.

EXAMPLE 24

Using a procedure analogous to that described in example 1, 1-M-tolyl-2-isopropylamino-pentanone-(1) was prepared from 1-m-tolyl-2-bromo-pentanone-(1) and isopropylamine. Its hydrochloride had a melting point of 212.5°–213° C.

EXAMPLE 25

Using a procedure analogous to that described in example 1, 1-m-tolyl-2-n-butylamino-pentanone-(1) was prepared from 1-m-tolyl-2-bromo-pentanone-(1) and n-butylamine. Its hydrochloride had a melting point of 172°–181° C.

EXAMPLE 26

Using a procedure analogous to that described in example 1, 1-m-tolyl-2sec.butylamino-pentanone-(1) was prepared from 1-m-tolyl-2-bromo-pentanone-(1) and sec.butylamine. Its hydrochloride had a melting point of 199°–201° C.

EXAMPLE 27

Using a procedure analogous to that described in example 1, 1-P-tolyl-2-ethylamino-pentanone-(1) was prepared from 1-p-tolyl-2-bromo-pentanone-(1) and ethylamine. Its hydrochloride had a melting point of 218°–222° C.

EXAMPLE 28

Using a procedure analogous to that described in example 1, 1-p-tolyl-2-n-propylamino-pentanone-(1) was prepared from 1-p-tolyl-2-bromo-pentanone-(1) and n-propylamine. Its hydrochloride had a melting point of 221°–224° C.

EXAMPLE 29

Using a procedure analogous to that described in example 1, 1-p-tolyl-2-isopropylamino-pentanone-(1) was prepared from 1-p-tolyl-2-bromo-pentanone-(1) and isopropylamine. Its hydrochloride had a melting point of 235°–239° C.

EXAMPLE 30

Using a procedure analogous to that described in example 1, 1-p-tolyl-2-n-butylamino-pentanone-(1) was prepared from 1-p-tolyl-2-bromo-pentanone-(1) and n-butylamine. Its hydrochloride had a melting point of 213°–217° C.

EXAMPLE 31

Using a procedure analogous to that described in example 1, 1-p-tolyl-2-sec.butylamino-pentanone-(1) was prepared from 1-P-tolyl-2-bromo-pentanone-(1) and sec. butylamine. Its hydrochloride had a melting point of 223°–226° C.

EXAMPLE 32

Using a procedure analogous to that described in example 1, 1-phenyl-2-ethylamino-hexanone-(1) of the formula

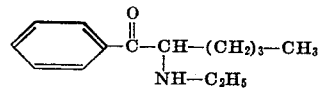

was prepared from 1-phenyl-2-bromo-hexanone-(1) and ethylamine. Its hydrochloride had a melting point of 171°–175° C.

EXAMPLE 33

Using a procedure analogous to that described in example 1, 1-phenyl-2-isopropylamino-hexanone-(1) was prepared from 1-phenyl-2-bromo-hexanone-(1) and isopropylamine. Its hydrochloride had a melting point of 196°–198° C.

EXAMPLE 34

Using a procedure analogous to that described in example 1, 1-phenyl-2-n-butylamino-hexanone-(1) was prepared from 1-phenyl-2-bromo-hexanone-(1) and n-butylamine. Its hydrochloride had a melting point of 135°–140° C.

EXAMPLE 35

Preparation of 1-phenyl-2-isopropylamino-pentanone-(1) by Method B 0.9 g. of 1-phenyl-2-amino-pentanone-(1) was dissolved in 30 cc. of acetonitrile, and then 0.43 g. of isopropyliodide and 1.0 g. of sodium bicarbonate were added to the solution. The resulting mixture was allowed to stand for 2 days at room temperature. Thereafter the reaction mixture was evaporated in vacuo, the residue was taken up in water, the aqueous solution was extracted with ether, and the ether extract solution was evaporated. The residue was identified to be 1-phenyl-2-isopropylamino-pentanone-(1). The yield was about 30 percent of theory.

EXAMPLE 36

Preparation of 1-phenyl-2-sec.butylamino-pentanone-(1) by Method E 0.5 g. of 1-phenyl-2-sec.butylamino-n-pentanol-(1) were admixed with the complex salt prepared from 0.186 g. of chromium oxide and 15 g. of pyridine according to Sarett, J.A.C.S. 75, 427 (1953), and the mixture was allowed to stand overnight at room temperature. Thereafter, the reaction mixture was poured into water, the aqueous solution was made alkaline, and the alkaline solution was extracted with ether. The ether extract solution was evaporated, leaving as a residue 1-phenyl-2-sec.butylamino-pentanone-(1). The identification of the product was confirmed by chromatographic and infrared spectrum comparison with a known sample. The yield was about 50 percent of theory.

EXAMPLE 37

Preparation of 1-(3'-cyanophenyl)-2-isopropylamino-pentanone-(1) by Method A 25.4 g. of 1-(3'-cyanophenyl)-2-bromo-pentanone-(1) were dissolved in 90 cc. of absolute benzene, and then a solution of 16.2 g. of isopropylamine in 100 CC. of absolute ether was added thereto. The reaction solution was then heated to 45° C. and was maintained at that temperature for 16 hours. Thereafter, the reaction solution was allowed to cool, extracted several times with benzene and the organic phase was dried over magnesium sulfate, filtered and evaporated in vacuo. The residue was dissolved in isopropanol, and ethereal hydrochloric acid was added to the solution. The crystalline precipitate formed thereby was recrystallized twice from isopropanol/ether yielding 9.9 g. 38.9 percent of theory) of a compound having a melting point of 196°–201° C. It was identified to be chromatographically pure 1-(3'-cyanophenyl)-2-isopropylamino-pentanone-(1) hydrochloride of the formula

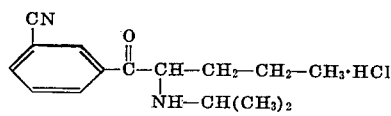

The racemic mixtures and optical antipodes of the compounds embraced by formula I above, as well as the nontoxic acid addition salts of the racemic mixtures and optical antipodes, have useful pharmacodynamic properties. More particularly, they exhibit very effective anorexigenic activities in warm-blooded animals, such as rats and mice, without, at the same time, significantly stimulating the central nervous system.

Thus, the present invention satisfies a long felt need in the field of anorexigenic pharmaceuticals in that, unlike other phenyl-substituted alkylamino-alkanones, the compounds of the formula I exhibit insignificant central nervous system stimulating activities at dosage levels where their anorexigenic activities are highly effective.

The pharmacodynamic activities of the compounds of the formula I set forth above were ascertained in the following manner:

I. Test for appetite-curbing activity.

Animal subjects:
Male or female laboratory rats; initial body weight 200–250 g.; six animals per test group.

Equipment:
Metabolism cages with fine wire mesh over drain opening to trap scattered feed; feed cups; weighting scale.

Test method:
J. Spengler and P. Waser, Arch. exp. Path. u. Pharmakol 237, 171 (1959).

Test procedure and evaluation

In preparation for the test, the groups of animals were fasted for 24 hours but had free access to drinking water. Thereafter, an accurately weighed amount of food was offered to the animals in the cages for 2 hours, and at the end of that time the feed cups were removed, the scattered food was carefully collected, and the amount of consumed food was determined by weighing the food remaining in the feed cups as well as the scattered food. When the unconsumed food is carefully collected, the experimental error is no more than 1 to 2 percent. Drinking water was freely accessible to the animals during the entire period. The amount of consumed food was converted to g./100 body weight.

The compounds under investigation were administered to the animals by subcutaneous injection or orally by means of an esophageal sound. The various groves of rats were subjected to this test once a week, always on the same day of the week and at the same time of day, over a total of about 3 months. Between tests, the animals had free access to the same kind of food and water, and were kept three to a cage.

In analogous control tests it was found that the food consumption within any group of animals from day to day varies less than from one group to another on the same day. Therefore, the control value of normal food consumption was determined on the same group of rats, where the control animals were given 0.1 ml./100 g. body weight of water orally or a physiological NaCl solution subcutaneously prior to the 2-hour feeding period. Two to three such control tests were made before the compounds under investigation were tested, and these control tests were later repeated at intervals of 5 weeks. The food consumption in these control tests ranged from 1.13 to 3.29 g./100 g. body weight, and the mean value of these limits was used as the control value. The anorectic effect of the test compounds was expressed in terms of the percentage reduction of the control value. Each test compound was tested at two to four different dosage levels by subcutaneous administration, beginning at 20 mg./kg. body weight. Especially active compounds were subjected to a greater number of tests and also by oral administration. From the values thus obtained, the median effective dose ($ED_{50}$), that is, the dose which reduces the food intake by 50 percent over the controls, was determined for each test compound by quantitative comparison with the aid of dosage-activity curves against the standard agents Benzedrine and Phenmetrazine.

II. Determination of CNS stimulating activity

Animal subjects:
Male laboratory rats; body weight about 150–200 g. at the beginning of the test series, and about 300–400 g. at the end.

Equipment:
Vibrating cages mounted on steel balls. The cages were constructed so that strong locomotoric movements of the animals caused the closing of an electrical contact, whereas weak movements, such as grooming, did not close the contact. The sensitivity of this arrangement and the inherent vibration of the cages were checked and readjusted weekly with the aid of a calibration pendulum, so that one calibrated pendulum swing caused the closing of at least six and no more than eight electrical contacts. The number of contact closings was counted with the aid of a counting device and was recorded hourly.

Test procedure and evaluation

Groups of six rats each were used once a week over a total period of about 3 months. Before each test the animals were kept in a vibrating cage without treatment of any kind to get them accustomed to the cage. Thereafter, their spontaneous motor activity was determined in two or three control tests at weekly intervals; the animals received 0.5 ml. of an aqueous 0.9 percent sodium chloride solution subcutaneously and in some instances also orally, and the number of electrical contacts was recorded hourly over a total of 6 hours. The hourly number of contacts caused by the control animals varied between 20 and 3,332, and the total number of contacts over 6 hours varied between 1,140 and 5,899. After conclusion of the control tests the groups of animals received varying doses of the test compounds subcutaneously and in some instances also orally, at intervals of 1 week. Each dosage level was tested on two groups of animals. In each case the hourly number of contacts was recorded, the total number of contacts over a 6-hour period was added, and the average number of contacts was calculated for each compound. These average values were plotted as a dosage-activity curve, and the median effective dose which causes 5,000 contacts over a period of 6 hours ($ED_{5000}$) was graphically determined.

III. Acute Toxicity

The toxicity was determined on adult laboratory mice of the NMRI-strain. The test compounds were injected subcutaneously under the dorsal skin at various dosage levels, the animals were observed for 24 hours, and the number of animals which died during that period was recorded. The mice were individually kept in rectangular plastic cages, height 14 cm., floor area 15×20 cm.

The resulting values were evaluated according to G. Kärber, Arch. exper. Path. u. Pharm. 162, 480 (1931), to obtain the median lethal dose ($LD_{50}$), i.e. the dose which causes 50 percent of the animals to perish, for each compound.

Representative results obtained in tests I, II and III above are summarized in the following table, in which A=1-phenyl-2-n-propylamino-butanone-(1), described in example 1 above;
B=1-phenyl-2-ethylamino-pentanone-(1), described in example 12 above; and
C=1-p-tolyl-2-ethylamino-pentanone-(1), described in example 27 above.

TABLE

| Compound | (X) Anorectic ED$_{50}$, mgm./kg. | (Y) CNS stimulating ED$_{5000}$, mgm./kg. | (Z) LD$_{50}$, mgm./kg. | Therapeutic ratio Z/X |
|---|---|---|---|---|
| A | 5.8 | 11.8 | 500 | 83 |
| B | 2.0 | 1.8 | 230 | 110 |
| C | 5.2 | 5.5 | 310 | 63 |

For pharmaceutical purposes the compounds are administered to warmblooded animals perorally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups and the like. One effective dosage unit of the compounds is from 0.166 to 2.5 mg./kg. body weight, preferably 0.41 to 1.25 mg./kg. body weight.

The following examples illustrate a few dosage unit compositions according to the instant invention and represent the best mode contemplated of putting the invention to practical use. The parts are parts by weight unless otherwise specified.

EXAMPLE 38

Tablets

The tablet composition was compounded from the following ingredients:

| 1-Phenyl-2-n-propylamino-butanone-(1) maleate | 35.0 parts |
| Calcium phosphate | 150.0 parts |
| Corn starch | 164.0 parts |
| Lactose, pulverized | 80.0 parts |
| Colloidal silicic acid | 14.0 parts |
| Magnesium stearate | 2.0 parts |
| Gelatin | 5.0 parts |
| Total | 450.0 parts |

Compounding procedure:

The butanone compound, the lactose and a substantial portion of the corn starch and of the silicic acid were thoroughly admixed with each other, and the mixture was moistened with an aqueous 10 percent solution of the gelatin. The moist mass was forced through a 1.5 mm. mesh screen, the moist granulate obtained thereby was dried for about 12 hours at 45° C., and the dry granulate was again passed through the screen. Thereafter, the granulate was thoroughly admixed with the remainder of the corn starch and of the silicic acid as well as with the magnesium stearate, and the resulting mixture was pressed into 450 mg. tablets. Each tablet contained 35 mg. of the butanone compound and, when administered perorally to a warmblooded animal of about 60 kg. body weight in need of such treatment, produced very good anorectic effects without significant CNS stimulation.

EXAMPLE 39

Sustained-release Tablets

The tablet composition was compounded from the following ingredients:

| 1-Phenyl-2-n-propylamino-butanone-(1) hydrochloride | 75.0 parts |
| Hydrogenated castor oil | 105.0 parts |
| Lactose, pulverized | 15.0 parts |
| Corn starch | 13.0 parts |
| Talcum | 10.0 parts |
| Magnesium stearate | 2.0 parts |
| total | 220.0 parts |

Compounding procedure:

The hydrogenated castor oil was heated to its melting point, the butanone compound was uniformly distributed therein, and the mixture was stirred until it had cooled to about room temperature. The solidified mass was then comminuted to a particle size of 1.5 mm., admixed with a filler granulate consisting of the lactose and the corn starch, and the mixture was uniformly admixed with the talcum and the magnesium stearate. The resulting composition was pressed into 50 mg. tablets. Each tablet contained 75 mg. of the butanone compound, and, when administered perorally to a warmblooded animal of about 60 kg. body weight in need of such treatment, produced very good anorectic effects without significant CNS stimulation.

EXAMPLE 40

Gelatin Capsules

The capsule filler composition was compounded from the following ingredients:

| 1-Phenyl-2-n-propylamino-butanone-(1) hydrochloride | 30.0 parts |
| Lactose, pulverized | 230.0 parts |
| Total | 260.0 parts |

Compounding procedure:

The butanone compound was homogeneously admixed with the lactose, and 260 mg. portions of the mixture were filled into gelatin capsules of suitable size. Each capsule contained 30 mg. of the butanone compound and, when administered perorally to a warmblooded animal of about 60 kg. body weight in need of such treatment, produced very good anorectic effects without significant CNS stimulation.

Analogous results were obtained when an equal amount of any one of the other racemic or optically active compounds embraced by formula I above or a nontoxic acid addition salt thereof was substituted for the particular 1-phenyl-2-aminoalkanone compound in examples 38 to 40. Likewise, the amount of active ingredient in these examples may be varied to achieve the dosage unit range set forth above, and the amounts and nature of the inert pharmaceutical carrier ingredients may be varied to meet particular requirements.

While the present invention has been illustrate with the aid of certain specific embodiments thereof, it will be readily apparent to other skilled in the art that the invention is not limited to these particular embodiments, and that various changes and modifications may be made without departing from the spirit of the invention.

We claim:

1. An orally administrable pharmacodynamic dosage unit composition consisting essentially of an inert pharmaceutical carrier and an effective anorexigenic amount of a compound of the formula

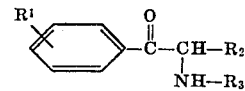

wherein
R$_1$ is hydrogen, methyl or cyano, and
R$_2$ and R$_3$ are each alkyl of two to four carbon atoms, or a nontoxic, pharmacologically acceptable acid addition salt 2. The method of curbing the appetite of a warmblooded animal which comprises orally administering to said animal an effective anorexigenic amount of a compound of the formula

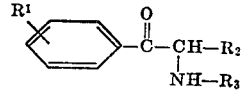

wherein
R$_1$ is hydrogen, methyl or cyano, and
R$_2$ and R$_3$ are each alkyl of two to four carbon atoms,
or a nontoxic, pharmacologically acceptable acid addition salt thereof.

* * * * *

PO-1050
(5/69)

UNITED STATES PATENT OFFICE
CERTIFICATE OF CORRECTION

Patent No. 3,622,675          Dated November 23, 1971

Inventor(s) HERBERT KÖPPE, GERHARD LUDWIG and KARL ZEILE

It is certified that error appears in the above-identified patent and that said Letters Patent are hereby corrected as shown below:

Col. 1, line 20, "from 3, which may be identical to or different form" should read
--$R_3$, which may be identical to or different from--.
Col. 2, line 52, "$R_{33}$" should read --$R_3$--.
Col. 3, line 43, "$2^{33}$" should read --Z--.
Col. 5, line 17, "1,11-o" should read --1,1-o --.
Col. 6, line 9, "toly" should read --tolyl--.
Col. 7, line 12, "1-0-tolyl" should read --1-o-tolyl--;
    " 19, "1-0-tolyl" should read --1-p-tolyl--;
    " 31, "1-M-tolyl" should read --1-m-tolyl--;
    " 39, "1-M-tolyl" should read --1-m-tolyl--;
    " 59, "1-P-tolyl" should read --1-p-tolyl--.
Col. 8, line 11, "1-P-tolyl" should read --1-p-tolyl--.
Col. 9, line 12, "38.9" should read --(38.9--;
    " 63, insert --g.-- after "g./100";
    " 66, change "groves" to --groups--.

Signed and sealed this 30th day of May 1972.

(SEAL)
Attest:

EDWARD M. FLETCHER, JR.
Attesting Officer

ROBERT GOTTSCHALK
Commissioner of Patents